United States Patent
McElligott et al.

(10) Patent No.: US 6,746,527 B1
(45) Date of Patent: Jun. 8, 2004

(54) AQUEOUS MAGNETIC INK CHARACTER RECOGNITION INK-JET INK COMPOSITION CONTAINING A COMBINATION OF SPECIAL SURFACTANTS

(75) Inventors: Michael J. McElligott, Rochester, NY (US); Donald E. Snyder, Jr., Spencerport, NY (US); Ronald E. Coutta, Cookeville, TN (US)

(73) Assignee: Nu-kote International, Inc., Franklin, TN (US)

( * ) Notice: Subject to any disclaimer, the term of this patent is extended or adjusted under 35 U.S.C. 154(b) by 0 days.

(21) Appl. No.: 10/397,912

(22) Filed: Mar. 26, 2003

(51) Int. Cl.$^7$ ................................................ C09D 11/00
(52) U.S. Cl. ................................ 106/31.65; 106/31.67; 106/31.66; 106/457; 106/460; 106/480; 106/479; 106/453; 106/499
(58) Field of Search ............................ 106/31.65, 31.67, 106/31.66, 457, 460, 480, 479, 453, 499

(56) References Cited

U.S. PATENT DOCUMENTS

| | | |
|---|---|---|
| 4,026,713 A | 5/1977 | Sambucetti et al. |
| 5,026,427 A | 6/1991 | Mitchell et al. |
| 5,240,626 A | 8/1993 | Thakur et al. |
| 5,547,804 A | 8/1996 | Nishizawa et al. |
| 5,656,071 A | 8/1997 | Kappele et al. |
| 5,670,078 A | 9/1997 | Ziolo |
| 5,969,003 A | 10/1999 | Foucher et al. |
| 6,638,982 B2 * | 10/2003 | Brown ........................ 516/86 |

* cited by examiner

Primary Examiner—Mark L. Bell
Assistant Examiner—Veronica F. Faison
(74) Attorney, Agent, or Firm—Fay, Sharpe, Fagan, Minnich & McKee, LLP

(57) ABSTRACT

An aqueous ink-jet ink composition for MICR applications is provided comprising a metal oxide pre-dispersion combined with an aqueous ink-jet ink composition, wherein the metal oxide pre-dispersion contains metal oxide pigment or particles of a very small particle size, at least one surfactant to aid in the aid in the dispersion of the metal oxide particles. Particularly, the surfactant component is a combination of an anionic surfactant and an anionic-nonionic surfactant, or may be a combination of other types of surfactants.

7 Claims, No Drawings

AQUEOUS MAGNETIC INK CHARACTER RECOGNITION INK-JET INK COMPOSITION CONTAINING A COMBINATION OF SPECIAL SURFACTANTS

The invention relates to ink-jet ink compositions, and more particularly to ink-jet ink compositions suitable for use in the preparation of MICR documents. Specifically, the invention relates to aqueous ink-jet ink compositions containing extremely small particle size conductive metal oxides that have been treated to enhance performance and suspension parameters.

BACKGROUND OF THE INVENTION

Conventional aqueous ink-jet ink compositions contain a dye or pigment, a solvent system, which may be aqueous or non-aqueous in nature, and which may include a combination of various solvents or a single solvent, and various other components such as humectants, surfactants, dispersion aides, biocide or fungicide, and other components. These components are for the most part known in the industry, and when combined according to conventional techniques for ink-jet ink processing and preparation, create inks well suited to various printers and the specific print processing parameters of these printers.

Of particular interest in this invention are inks suited for use in drop-on-demand and continuous print processing and which contain a conductive metal oxide component. These inks are generally categorized as magnetic inks, and may be used in various applications. One such application is the preparation of magnetic ink character recognition, or "MICR", readable documentation. This type of application involves the use of magnetic ink to print all or part of a document, usually for security purposes. For instance, some "documents" where MICR readable ink compositions are used include checks, bonds, security cards, etc. MICR ink may be used to print an entire document, or only a portion thereof. For instance just the bar code region or only certain characters may be printed with MICR readable ink. The document, once printed and subjected to an appropriate source of magnetization, is then passed through or under a MICR reading device, which validates or authenticates the document based on the MICR encoded characters or printed matter. The step of magnetizing the MICR ink once printed and before use imparts a specific magnetic charge to the magnetic component of the ink, causing an alignment of the particles. The particles must then retain the magnetic charge. The capability of a magnetic material to retain the imparted charge is referred to as remanence. Generally, this parameter increases with an increase in the particle size of the magnetic material. However, the larger the particle size the more difficult it is to maintain the particle in suspension within an ink composition. Additionally, the print head nozzles of current ink-jet printers are very small, therefore the particulate matter in an acceptable ink-jet ink must be small in order to avoid clogging the nozzles, whether during printing or over an extended period of time.

This need to maintain high remanence, but to decrease the particle size of the magnetic material to a very small size, presents a unique problem for potential MICR ink-jet ink manufacturers. The challenges of formulating a suitable ink-jet ink for use in MICR printing applications revolve around the need to achieve an ink composition containing very small particle size magnetic material, due to the size of the print head nozzles, and to retaining the particles in suspension. Also, for MICR inks it is necessary to maintain the necessary level of remanence within the particulate matter in the ink such that the MICR readable characteristic of the ink is not compromised. Remanence is directly proportional to the size of the particle, thus decreasing the particle size of the magnetic material in order to avoid nozzle clogging of the print heads may also decrease the remanence parameter of the ink. One means of addressing a loss of remanence is to increase the magnetic component loading. This, however, is difficult due to the tendency of the particulate matter to settle out of solution as the amount of particulate matter in the ink composition is increased.

Various attempts have been made to address the problem of retaining the magnetic pigment or particulate matter in suspension. For example, U.S. Pat. Nos. 5,026,427, 5,240, 626, and 5,656,071 each suggest the use of specific dispersants to maintain the suspension. The U.S. Pat. No. 5,656,071 patent discloses an ink composition including a polymeric dispersant to maintain a metal oxide in solution and a co-solvent mixture of 1,3-propanediol or 1,4-butanediol with a second solvent selected from polyethylene glycol-type materials and polyol/polyalkylene oxide condensates. The other patents involve the use of colloidally dispersed magnetite in conjunction with a specified dispersant component. U.S. Pat. No. 5,240,626 discloses an ink including colloidally dispersed magnetite particles coated with a carboxy compound-type anti-agglomeration agent and a dispersing aid. The U.S. Pat. No. 5,026,427 patent teaches generally the preparation of a magnetic ink composition containing magnetic particles and specific dispersants to maintain the dispersion. Another means of addressing the suspension issue is set forth in U.S. Pat. No. 4,026,713. This patent discloses the use of a combination of surfactants and glycerol to make stable magnetic inks.

Yet another means of addressing the suspension problem of magnetic inks has been the use of resin components to enhance the oxide suspension. U.S. Pat. Nos. 5,547,804, 5,670,078, and 5,969,003 are examples of this type of response to the problem. In U.S. Pat. No. 5,547,804 a solvent-based dispersion is aided using a co-polymer resin. The U.S. Pat. No. 5,670,078 patent discloses the use of an ion exchange-type resin to maintain the dispersion. The U.S. Pat. No. 5,969,003 patent teaches the use of a sulfonated polyester resin to achieve and maintain the oxide component in suspension.

While several of the foregoing patents suggest peripherally that the use of the stated techniques to maintain particulate matter in suspension may be applicable to magnetic inks, none really addresses MICR ink and the specific set of problems particular thereto, such as particle size, remanence, and suspension, among other concerns. None satisfactorily addresses the need to increase magnetic particle content or loading, and thus maintain high remanence of the overall ink composition, without jeopardizing the dispersion necessary in order to attain an ink with the desired shelf life and one that will not clog the very small print head nozzles used in ink-jet printing equipment.

SUMMARY OF THE INVENTION

The challenges of formulating a suitable ink-jet ink for use in MICR printing applications revolve around the need to achieve an ink composition containing very small particle size magnetic material, due to the size of the print head nozzles, and yet maintain the necessary level of remanence within the particulate matter in the ink such that the MICR readable characteristic of the ink is not compromised. The invention relates to a means of achieving the foregoing challenge.

In one aspect of the invention an aqueous MICR ink-jet ink is provided wherein the ink comprises a metal oxide dispersion mixed with an ink-jet ink composition, the metal oxide dispersion being particularly characterized by the inclusion of a combination of surfactants and a metal oxide particulate, the surfactants functioning to enhance the dispersion of the particulates.

Other inventive aspects will become apparent to the skilled artisan from a reading of the Detailed Description of the Invention.

DETAILED DESCRIPTION OF THE INVENTION

The invention relates to the use of extremely small particle size metal oxides in the preparation of MICR ink-jet ink compositions. Of special interest is the capability of the comparatively small particle size metal oxides to exhibit adequate or better remanence. Of further interest is the ability of the ink composition to retain the small metal oxide particles in suspension for extended periods of time. Additionally, the MICR ink-jet ink does not exhibit any tendency to clog the small nozzles of the ink-jet print head, despite the particulate content of the ink.

One ink-jet ink composition that meets the foregoing criteria comprises a metal oxide pre-dispersion, i.e., a dispersion containing the metal oxide component that is prepared for addition to the remaining ink formulation. This dispersion includes specific metal oxide components that have been specially prepared in order to achieve the desired performance. The dispersion may then be included in an ink-jet ink composition suitable for use in MICR applications.

Magnetic iron oxides in conventional MICR transfer applications consist of a dried film containing iron oxide, binders and oils, wherein the iron oxide is held in the dried binder matrix, after the solvent is evaporated. Therefore, settling problems are not an issue. The magnetic iron oxide used in MICR ink-jet applications, however, is different than that used in conventional impact or thermal transfer applications. The iron oxide intended for use in MICR ink-jet applications must be produced in smaller particle size than conventional applications because it must pass through the very small orifices of an ink-jet print head, and it will be used in aqueous compositions. Further, it must exhibit and retain the proper magnetic properties, it must have good dispersibility within aqueous liquid systems, and it must have good hydrophillic suspension properties. These properties are not as stringently required with conventional MICR applications that are based on non-aqueous solvent suspensions or hot melt wax technologies.

Another concern in the formulation of MICR ink-jet inks as opposed to conventional MICR inks presents itself in the form of the ink, i.e., MICR ink-jet inks must be fluid, and not dry. Because iron oxide has a specific gravity of approximately 5 it has a natural tendency to settle to the bottom of a fluid ink composition, resulting in a non-homogenous fluid having an iron oxide rich lower layer and an iron oxide deficient upper layer. Therefore, a main challenge in developing MICR ink-jet ink is keeping the iron oxide homogeneously suspended in the fluid ink composition, and having the size of the iron oxide particles small enough to pass through the orifices of an ink-jet print head. The iron oxide must also meet the requirement of having sufficient magnetic signal strength to be readable in MICR reader/sorter equipment, such as that employed by the banking industry. Achieving sufficient signal strength becomes increasingly difficult as the metal oxide particle size diminishes and the practical limits on percent content of metal oxide in the ink composition are reached.

Although magnetite or synthetic magnetic iron oxide is the preferred magnetic component for MICR ink-jet ink applications, there are other materials that may also be employed. Therefore, any reference used hereafter to an iron oxide component is equally applicable to these other metal oxides and metal-containing compounds unless otherwise specified. For example, another suitable metal may be substituted in part for the iron component in the oxide compound to yield bi- or tri-metallic materials with the proper magnetic properties. Additionally, compounds without any iron content provide another possibility. Such materials include, but are not limited to, certain copper germanium oxide and vanadium oxide complexes. Yttrium manganese hydrogen has magnetic properties and compounds where the yttrium is substituted with rare earth elements (Gd, Tb, Dy, Ho) may also be used.

The foregoing materials are representative of the type of metal and/or metal-containing compounds which may be used in conjunction with iron, or as a substitute for iron, in the production of MICR ink-jet inks.

MICR ink-jet ink must also exhibit low viscosity, typically on the order of less than about 5 cps and more preferably on the order of about 1–2 cps, in order to function properly in both drop-on-demand type printing equipment, such as thermal bubble jet printers and piezoelectric printers, and continuous type print mechanisms. The use of low viscosity fluids, however, adds to the concerns of successfully incorporating metal oxides into the ink solution because particle settling will increase in a low viscosity, thinner fluid as compared to a more viscous, thicker fluid.

The formulation of MICR ink-jet ink gives rise to yet another unique consideration, in addition to that of choosing a suitable oxide component. This consideration revolves around the difficulty in obtaining a good dispersion. One reason for this difficulty is the high density of the iron oxide material and the inherent tendency of the oxide to settle out of solution. It has now been determined that one means to achieving a good dispersion with the iron oxide is to treat the metal oxide particle pre-dispersion with a hydrophilic surfactant or a combination of surfactants. Surfactants, or surface active agents, are substances that function to increase the spreading and wetting properties of a liquid, and usually reduce the overall viscosity and surface tension of the liquid.

The surface-active molecule must be at least partly hydrophilic when being incorporated into an aqueous liquid medium. Therefore, a particular type of molecular structure readily lends itself to use as a surfactant. This molecular structure includes a water-soluble or hydrophilic component, and a water insoluble or hydrophobic component. The hydrophobe is usually the equivalent of a hydrocarbon having from about 8 to 18 carbons, and can be aliphatic, aromatic, or a mixture of both. The sources of hydrophobes are normally natural fats and oils, petroleum fractions, relatively short synthetic polymers, or relatively high molecular weight synthetic alcohols, and the like. The hydrophilic groups give the primary classification to surfactants, and are categorized as anionic, cationic or non-ionic in nature. The anionic hydrophiles generally belong to a group including carboxylates (soaps), sulphates, sulphonates, phosphates, and the like. The cationic hydrophiles are generally a form of an amine product. The non-ionic hydrophiles associate with water at the ether oxygens of a polyethylene glycol chain. The hydrophilic end of the surfactant is strongly attracted to the water molecules of an aqueous solution. The force of attraction between the hydrophobic component of the surfactant and the water is only slight. As a result, the surfactant molecules align themselves at the surface and internally so that the hydrophile end is oriented toward the water and the hydrophobe is oriented away from the water. This internal group of surfactant molecules is referred to as a micelle.

Because of this characteristic behavior of surfactants to orient at surfaces and to form micelles, all surfactants perform certain basic functions. However, each different type of surfactant excels in certain functions and has others in which it is deficient. Dispersants are surfactants that suspend a solid in water or some other liquid. In this instance, the surfactant functions to form what amounts to a protective coating around the suspended material, and the hydrophilic ends associate with the neighboring water molecules. In addition to the manner in which the characteristics of a specific surfactant affect the stability of a suspension, the particle size and density of the suspended material also affect the stability of the suspension. Therefore, each factor must be addressed to achieve a desired result.

In applying the foregoing to the use of iron oxide pigments in the formulation of aqueous MICR ink-jet inks, it is important to note that if the outer surfactant coating is hydrophilic there is a greater tendency to have an affinity with water through hydrogen bonding and ionic charge complexes. Both hydrogen bonding and ionic charge complexing of a material in an aqueous medium impart better suspension properties, i.e., less settling, to a solid material. It has now been determined that the best results with respect to the desired level of suspension are obtained by first adding particular surfactants to water with thorough mixing, followed by the slow addition of the iron oxide of choice with agitation for a period of time, about 10 to about 15 minutes.

It has further been determined that the use of a combination of particular surfactants can be selected to enhance the performance of the metal oxide component. For example, with a given iron oxide component evaluated herein, an anionic type surfactant, such as Tamol 731A which is a sodium salt of a maleic anhydride copolymer, and an anionic-nonionic or nonionic type surfactant, such as Surfonyl CT324, result in achieving an optimum dispersion. While not wishing to be bound by any specific comment regarding the method by which this optimum dispersion is achieved, it is theorized that the use of a combination of surfactants balances out the charge elements in the magnetic iron oxide pigment leading to a better dispersion with less settling than can be achieved by using only either surfactant type independently.

One novel concept in the use of surfactants as they relate to MICR ink-jet ink applications is the use of a combination of the various types of surfactants. Some potentially suitable surfactants are set forth below. The list is intended to be merely exemplary and in no way intended as a comprehensive menu of potential choices.

Anionic

Potentially suitable anionic surfactants may include: sodium or potassium salts of straight-chain fatty acids; sodium or potassium salts of coconut oils; acrylated polypeptides; sodium lauryl sulfate; sulfonates; disodium lauryl sulfonate; sodium xylenesulfonate; dodecylbenzene sulfonic acid; sodium isothionate; sodium tridecyl ether; disodium cocamido sulfosuccinate; sodium stearate; glycerol esters; aromatic and aliphatic phosphate esters; sulfated triglycerides; and other similar compounds.

Nonionic

Potentially suitable nonionic surfactants differ from both cationic and anionic surfactants in that the molecules are actually uncharged. The hydrophilic group in these compounds is made up of another very water soluble moeity, e.g. a short, water-soluble polymer chain) rather than a charged species. Traditionally, nonionic surfactants have used poly (ethylene oxide) chains, typically 10 to 100 units long, as the hydrophilic group.

Two common classes of surfactant that use poly(ethylene oxide) chains as their hydrophilic group are the alcohol ethoxylates and the alkylphenol ethoxylates. In these surfactants the poly(ethyleneoxide) chain forms the water soluble surfactant "head".

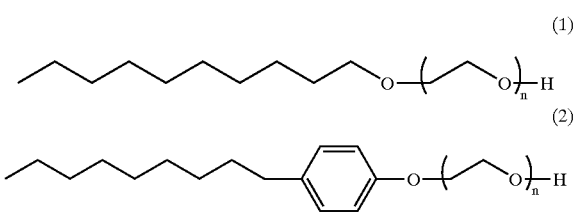

Another class of nonionic surfactants are the alkyl polyglycosides represented by structural formula (3). In these molecules, the hydrophilic group is sugar, shown in formula (3) as a polysaccharide, though may be made from disaccharides, trisaccharides, maltose and various other sugars.

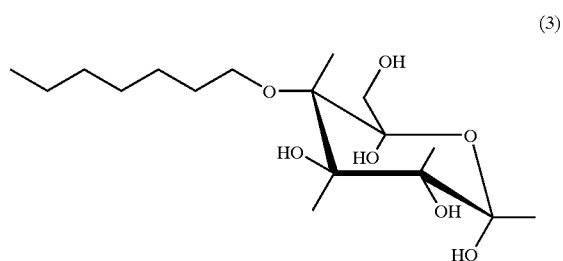

Examples of alkyl polyglycosides include alkyl glucosides and glucose esters, among others.

Although these compounds are called polyglycosides, they generally only have one or two sugar groups in the chain.

Some other nonionic surfactants include ethoxylated lauryl alcohol, nonylphenol ethoxylate, lauryl alcohol alkoxylate, octylphenol ethoxylate tridecyl alcohol ethoxylate, glycerol monostearate, glycerol monooleate, mono- and di-glyceride of stearate and oleate.

Anionic-Nonionic

Anionic-nonionic surfactants are basically nonionic surfactants as listed above with a small moiety of anionic surfactant, or are blends of anionic and nonionic surfactants. The components of this type of surfactant may be any of the foregoing anionic or nonionic surfactants or other similar anionic or nonionic surfactants.

Cationic

Finally, there are a number of potentially suitable cationic surfactants. Cationic surfactants, although not used in the preferred embodiment of this invention, may be used in certain cases to achieve chemical electrical balance if needed. Examples of cationic surfactants that could be used by those skilled in the art include: N-alkyltrimethylenediamine salts; N-aklyl-imidazolines;

oleyl imidazoline; bis(hydrogenated tallow alkyl)dimethyl ammonium chloride; isostearyl ethylimidonium ethosulfate; polyethyleneglycol tallow amine; polyethyleneglycol cocamine; and stearamideopropylphosphatidyl polyglycol dimonium chloride, among others. This list is exemplary only and not intended to be comprehensive or limiting in any way.

It has been determined that the combined effect of the foregoing parameters achieves an enhanced result that cannot be achieved by the use of any one method or component alone, though each aspect in and of itself does enhance the ink performance. These aspects include the use of metal oxides of small particle size and the use of a combination of various types of surfactants.

The small particle size metal oxide and the combination of surfactants must be incorporated into a pre-dispersion. This is accomplished by mixing the surfactants with an aqueous solvent system and then slowly adding the small particle size metal oxide component to achieve a homogenous solution or dispersion. This mixing may be done using conventional mixing equipment known to the skilled artisan.

Once the metal oxide dispersion has been prepared, the dispersion may be incorporated into an ink composition suitable for use in ink-jet printing equipment. The precise formulation for the ink is dependent to some degree on the type of print engine the ink will be used in, i.e., drop-on-demand or continuous, but in general the ink-jet ink will include some or all of the conventional ink-jet ink components. Among these components are colorants, humectants, dyes or pigments, stabilizers, surfactants, buffering agents, biocides, and water-soluble resins, to name a few. This list is not intended to be limitative of the components that may be used to formulate the ink-jet ink that will include the metal oxide dispersion, but rather is intended to exemplify some of the components that may be needed to properly formulate the final ink-jet ink.

In order to more completely demonstrate the ink-jet ink that is the subject hereof, an ink-jet ink was formulated and then tested in both drop-on-demand and continuous type printing equipment.

For the drop-on-demand testing, the ink-jet ink including a metal oxide dispersion prepared as in accord herewith was loaded into an HP45A cartridge and tested in an HP895 ink-jet printer. The HP45A cartridge was filled with the MICR ink-jet ink, and the print output font was configured with ANSI MICR specified characters on an IBM compatible computer. The printing media used was standard check stock MICR characters were generated on the check stock and evaluated for proper MICR performance per ANSI standards with an RDM MICR verifier.

The ink included an aqueous metal oxide dispersion, containing a combination of surfactants. Particularly, an anionic type surfactant and an anionic-non-ionic or non-ionic type surfactant were used.

| Drop-On-Demand Ink-Jet Ink Formulation A | |
|---|---|
| MICR Ink-Jet Formulation A: | |
| Metal Oxide Dispersion* (40% solids) | 35.00 |
| Carbon Black Ink-Jet Ink** | 35.00 |
| Deionized Water | 29.50 |
| Ultadditive 3010E/50 (defoamer) | 0.50 |
| Total | 100.00 |
| Percent Solids | 24.93 |

| -continued | |
|---|---|
| Drop-On-Demand Ink-Jet Ink Formulation A | |
| Percent Pigment (Oxide + Carbon Black) | 15.26 |
| Percent Oxide | 14.00 |
| *Metal Oxide Dispersion: | |
| Iron Oxide | 68.70 |
| Distilled Water | 27.30 |
| Surfonyl 324 CT | 2.00 |
| Tamol 731 A | 2.00 |
| Total | 100.00 |
| **Carbon Black Ink-Jet Ink: | |
| Cabojet 300 (15.1% Carbon Black in water) | 23.82 |
| Distilled Water | 53.99 |
| 2-Pyrollidone | 18.73 |
| 1,5-Pentanediol | 3.32 |
| Surfonyl 465 | 0.09 |
| Proxel GL (biocide) | 0.09 |
| Total | 100.04 |

The ink-jet ink formulated according to the above recipe was placed in an HP45 A cartridge and the machine was operated to generate the printing of 45 MICR characters on MICR card stock. The MICR characters were then evaluated on an RDM MICR Verifier and exhibited a Document Average Signal Level of 87% and 41/45 characters were clearly MICR readable.

Drop-On-Demand Ink-Jet Ink Formulation B

Another ink-jet ink composition including a metal oxide dispersion prepared in accord with the invention herein was formulated. This ink-jet ink formulation, Formulation B, was similar to the first formulation, Formulation A, but used a dispersion exhibiting a smaller metal oxide particle size.

| MICR Ink-Jet Formulation B: | |
|---|---|
| Metal Oxide Dispersion* (as in Formulation A, 30% solids) | 50.00 |
| Carbon Black Ink-Jet Ink* (as in Formulation A) | 35.00 |
| Deionized Water | 14.50 |
| Ultadditive 3010E/50 (defoamer) | 0.50 |
| Total | 100.00 |
| Percent Solids | 24.93 |
| Percent Pigment (Oxide + Carbon Black) | 15.26 |
| Percent Oxide | 14.00 |

The Formulation B Ink-Jet Ink was tested in accord with the testing performed on Formulation A and demonstrated a Document Average Signal Level of 89% and exhibited 44/45 characters that were MICR readable. The printed characters for this Formulation B displayed increased sharpness as compared to the characters printed from the Formulation A Ink-Jet Ink. This is attributed to the smaller particle size of the metal oxide and the lesser % solids in the dispersion.

The ink-jet ink formulations, including the metal oxide dispersion prepared in accord with the processing set forth herein were also tested in continuous type print equipment. For this testing, a continuous ink-jet print head set-up was prepared. The system was a continuous recirculating flow system that allowed for the evaluation of jetting properties of the ink through the individual print head nozzles under continuous use. The print head system was set up as a generator for the ink stream through the individual nozzles. There was no deflection unit. The individual ink streams through the nozzles were evaluated with a lighted magnifying inspection light for straightness of each ink stream going through each nozzle. Any curvature of a stream or blockage of a nozzle was noted. The system was monitored under pressure and any change to the pressure was noted. There were two filters in line in the system.

A straight stream without any curvature was a positive indication that no blockage was occurring due to large particle size or agglomeration. The dark black color of the stream was an indication that the pigment and the magnetic particles were jetting satisfactorily and passing properly through the in-line filters.

| Continuous Ink-Jet Ink Formulation C | |
|---|---|
| Magnetic Oxide | 40.0 |
| Distilled Water | 56.0 |
| Surfonyl 324CT | 2.0 |
| Tamol 731A | 2.0 |
| Total | 100.0 |

This formulation was diluted to 15% solids with distilled water. The formulation was tested on the continuous print set-up as described above. The ink started jetting at 10 psi but exhibited partial print head nozzle blockage after 15 minutes with pressure of 14 psi and by 30 minutes was experiencing total print head nozzle blockage at a pressure of greater than 30 psi.

The same formulation as Formulation C was modified according to the following:

| Continuous Ink-Jet Ink Formulation D | | |
|---|---|---|
| Formulation C | | 25.00 |
| Carbon Black Ink-Jet Ink: | | 75.00 |
| Cabojet 300 (15.1% Carbon Black in water) | 23.82 | |
| Distilled Water | 53.99 | |
| 2-Pyrollidone | 18.73 | |
| 1,5-Pentanediol | 3.32 | |
| Proxel GXL (biocide) | 0.09 | |
| Total | 100.00 | 1.00 |

This formulation was tested in the continuous print set-up in accord with the testing performed on Formulation C. Formulation D started jetting at 10 psi and continued with good nozzle flow for 2 hours, at which time a slight downward curvature was noted in the spray from the nozzle. The pressure was raised to 20 psi and good flow properties resumed. The system was allowed to sit overnight, and then was started up again the following day. The formulation performed in keeping with the good performance exhibited during the first day during the second day of testing, thus showing that the ink did not clog the nozzle upon sitting overnight.

The foregoing demonstrates an unexpected advantage in formulating and the performance parameters exhibited by MICR ink-jet ink if the ink contains a metal oxide pre-dispersion including small particle size metal oxide in aqueous solution with a combination of surfactants. Particularly, it demonstrates that the ink can be enhanced by adding a combination of an anionic type surfactant and a non-ionic/anionic or non-ionic type.

What we claim is:

1. An aqueous MICR ink-jet ink composition comprising a metal oxide pre-dispersion and an ink-jet ink composition, the metal oxide pre-dispersion comprising a homogeneous suspension comprising small metal oxide particles dispersed into a homogeneous mixture of an aqueous medium and a combination of surfactants, and the ink-jet ink composition comprising at least a colorant and an aqueous solvent.

2. The aqueous MICR ink-jet ink composition of claim 1 wherein the surfactants in said combination of surfactants are selected the group consisting of from an anionic surfactant, a nonionic surfactant, a cationic surfactant, or a combination thereof.

3. The aqueous MICR ink-jet ink composition of claim 1 wherein said metal oxide comprises an iron oxide and said combination of surfactants comprises a combination of an anionic surfactant and a nonionic or nonionic-anionic-type surfactant.

4. The aqueous MICR ink-jet ink composition of claim 1 wherein said metal oxide dispersion comprises iron oxide dispersed in a homogeneous mixture of distilled water, an anionic surfactant comprising the sodium salt of a maleic anhydride copolymer and an anionic-nonionic-type surfactant.

5. An aqueous MICR ink-jet ink pre-dispersion for use in the preparation of a MICR ink-jet ink comprising a small particle size metal oxide dispersed in a homogeneous mixture of an aqueous medium and a combination of an anionic surfactant and an anionic-nonionic surfactant.

6. The aqueous MICR ink-jet ink pre-dispersion of claim 5 wherein said metal oxide is an iron-containing oxide.

7. The aqueous MICR ink-jet ink pre-dispersion of claim 5 wherein said anionic surfactant comprises the sodium salt of a maleic anhydride copolymer.

* * * * *